Figure 1:
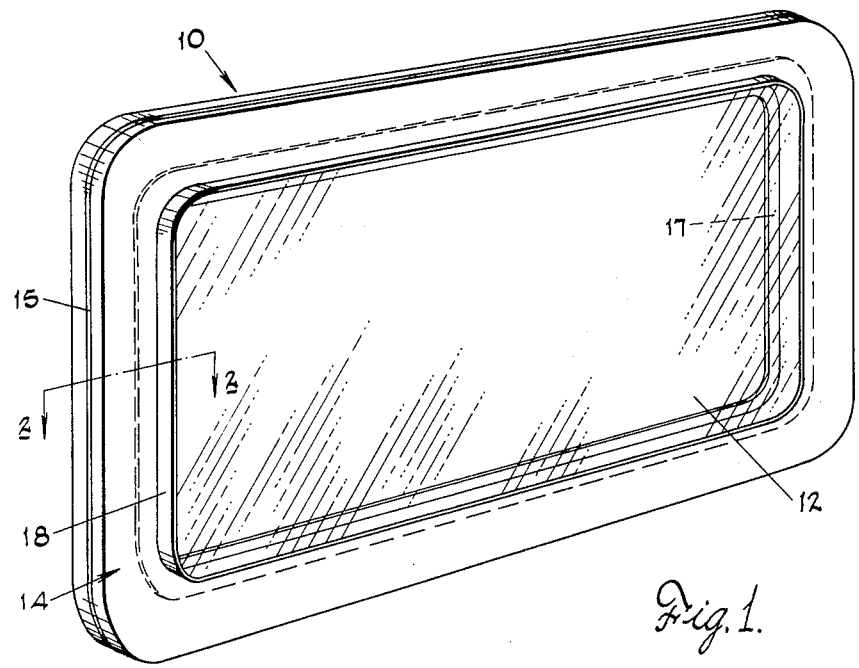

April 26, 1966  J. H. BOICEY  3,248,273
LAMINATED GLASS STRUCTURE
Filed Dec. 8, 1961

INVENTOR.
James H. Boicey
BY
Nobbe & Swope
ATTORNEYS

3,248,273
LAMINATED GLASS STRUCTURE
James H. Boicey, Toledo, Ohio, assignor to Libbey-Owens-Ford Glass Company, Toledo, Ohio, a corporation of Ohio
Filed Dec. 8, 1961, Ser. No. 158,021
7 Claims. (Cl. 161—45)

This invention relates generally to laminated glass and, more particularly, to an improved laminated glazing unit which, due to its novel structure, is highly resistant to cracking or degradation of the plastic interlayer in the daylight opening of the unit.

Laminated safety glass units, as are well known in the art, generally comprise two or more sheets of glass and one or more interlayers of a tough, flexible thermoplastic material all bonded together under the action of heat and pressure to produce a unitary composite structure. In addition, electrically conducting laminated structures are also well known in the art and are, in general, similar in construction to ordinary laminated glazing units, except that one of the glass sheets has an electrically conducting coating on an inner surface thereof. This electrically conducting coating is, in the majority of applications, a transparent film, for example, of tin oxide, and in order to conduct electricity to and from the coating, electrodes are provided, usually along two opposite marginal portions of the coated glass and laminated into the unit. To date such electrically conductive units have found their principal utility as de-icing windows or canopy glazings in aircraft.

Now, ordinary laminated glazing units, as well as electrically conductive, laminated units, as produced by present-day techniques, are for the most part very stable articles, even under severe temperature and speed conditions. However, the advent of aircraft capable of speeds near or considerably above the supersonic range has presented serious problems during service in maintaining the glazing units free from the ingress of vapors between the glass sheets comprising such units. This vapor problem is particularly grave since it has been found to be responsible for cracking or degradation of the thermoplastic interlayer between the glass sheets resulting in making vision through the glazing unit impossible and eventually completely destroying the bond between the interlayer and the glass sheets.

It is a primary object of the invention to provide an improved glazing unit which, due to its novel structure, is particularly adapted for use in supersonic speed aircraft.

Another object of the invention is the provision of a novel laminated glazing unit and a method of making the same that successfully eliminates cracking or degradation of the thermoplastic interlayer in the daylight opening of such unit.

A further object of the invention is the provision of a laminated glass glazing unit which incorporates a vapor barrier in its structure to prevent ingress of harmful gases and the like between the laminated glass sheets of the unit.

Other objects and advantages of the invention will become more apparent during the course of the following description when taken in connection with the accompanying drawings.

Figure 2:
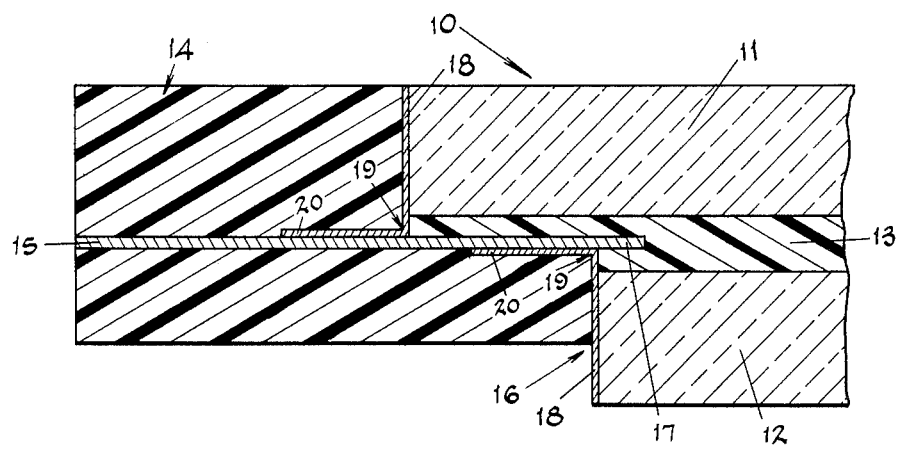

In the drawings, wherein like numerals are employed to designate like parts throughout the same:

FIG. 1 is a perspective view of a laminated glazing unit constructed in accordance with the invention; and FIG. 2 is a fragmentary cross-sectional view taken along the line 2—2 of FIG. 1.

Briefly stated, the present invention provides a laminated glass glazing unit comprising at least two spaced sheets of glass and one or more layers of an non-brittle plastic material interposed therebetween and integrally bonded to the sheets. The thermoplastic material is built up about the periphery of the sheets to provide a thickened portion which serves in essence as a mounting flange for the unit. A flat, annular reinforcing member, preferably of aluminum, also surrounds the sheets and projects inwardly through the thermoplastic material to a point between the glass sheets. In addition, a first moisture-impervious, flexible band or tape is provided which covers and is tightly adhered to the margin or edge of the glass sheet forming the inboard light of the unit and extends through the thermoplastic material into sealed engagement with one side of the reinforcing member, while a second flexible, moisture-impervious tape covers and is adhered to the edge of the sheet forming the outboard light of the unit and also extends through the thermoplastic material into sealed engagement with the other of the sides of the reinforcing member. It has been found that such a structure successfully withstands exposure to harmful vapor conditions for extremely long periods of time without exhibiting any indication of failure of the thermoplastic material in the daylight opening of the unit.

Referring now more particularly to the drawings, there is illustrated in FIGS. 1 and 2 a typical construction of a laminated glass glazing unit in accordance with the invention. The particular unit, which is designated generally by the numeral 10, is substantially rectangular in shape having slightly rounded corner portions whereby it is adapted to fit into the window opening of an aircraft which the structure is designed to glaze.

The unit 10 is composed of two panels of ordinary plate or sheet glass of any desired composition, one or the other or both of which may be tempered or semi-tempered, and a tough, flexible thermoplastic material all bonded together under the influence of pressure to provide a composite unitary structure. More specifically, the unit 10 comprises a glass sheet 11 forming the inboard light or panel thereof and a glass sheet 12 forming the outboard light or panel, the sheet 11 having a slightly larger surface area than the sheet 12 for shear strength considerations. These sheets are laminated together with a plastic interlayer 13 and the plastic portion of the unit built up or otherwise formed as at 14 to extend outwardly beyond the edges or margins of the glass sheets and provide a mounting flange.

Although any of the known plastic interlayer materials may be used in the glazing structure, excellent results have been obtained in producing units in accordance with the invention when using a clear or transparent "type K" silicone as the interlayer in the daylight opening of the glazing unit. This "type K" silicone, which is a transparent polymethyl siloxane elastomer especially compounded for use in aircraft glazing units, is commercially available from the Dow Corning Corporation in strip or layer form, for example, in .025 or .040 inch thicknesses, with the particular desired thickness of the interlayer being obtained by successive application of the silicone layers one on top of the other. As a specific example, units have been produced wherein both the inboard and outboard lights comprise a one-quarter inch tempered glass sheet and the plastic interlayer made up of successive layers of .040 inch thickness, .025 inch thickness and .040 inch thickness. In this same respect, it is preferred to employ a pigmented silicone as the plastic build-up material about the periphery of these sheets, good results having been obtained by merely adding a pigment such as titanium dioxide or calcium carbonate to the "type K" silicone. It has been found that such pigmented silicones provide better resistance to degradation by harmful atmospheric gases and thus reduce vapor penetration into the transparent interlayer portion itself. Again, this build-up or thickened portion 14 is most expediently formed by the successive application of silicone strips, previously pigmented, to produce the desired total thickness.

The plastic flange 14 of the pigmented silicone material is reinforced with an annular, flat metal frame member 15 which is preferably of aluminum and has a thickness of about .025 inch in the particular unit disclosed. Typically, the glazing unit is rabbeted at the junction of the plastic or silicone portion of the flange with the outboard panel 12 as indicated at 16 and the frame member drilled to permit the glazing unit to be mounted in an airplane with the outer surface of the light 12 flush with the outer surface of the skin of the aircraft. As is clearly illustrated in the drawings, the annular aluminum reinforcing member 15 extends through the plastic flange 14 to a point between the glass sheets 11 and 12 whereby the inner portion of such member, indicated at 17, is visible at the edges of, and in essence defines, the daylight opening of the unit.

Now, in accordance with the present invention, there is provided between the peripheral edges of the glass sheets 11 and 12 and the adjacent portions of the mounting flange, moisture-impervious, flexible tapes or bands 18. These tapes or vapor barriers extend from the inboard and outboard major surfaces of the sheets along the edges thereof and then through the plastic material into sealed contact with the metal frame member 15. Each of the tapes may comprise a plurality of strips, usually of the same number as the sides of the unit, such strips being overlapped slightly at the corner portions to insure a continuous barrier. The tapes in the particular unit illustrated preferably have a width of approximately .75 inch whereby they are creased as indicated at 19 and extend outwardly along opposite sides of metal frame member 15, as at 20, a distance slightly greater than one-quarter of an inch. Excellent results have been obtained in producing the structure in accordance with the invention with use of an aluminum tape of .05 inch thickness which is obtained commercially with a silicone adhesive applied to one surface thereof. Such a silicone adhesive has been found to produce an extremely strong bond with the edge of the glass sheets, the silicone interlayer 13, and the aluminum frame member 15. In addition to aluminum, it will be appreciated that thin bands of other metals or similar materials can also be employed as the vapor barrier, it being only necessary that the composition of the barriers be completely impervious to any harmful gases in a wide range of temperatures including any temperature encountered during service of a supersonic aircraft. It is also advantageous that the vapor band or tape be flexible to some extent to compensate for the different coefficients of expansions of the various materials making up the glazing units.

When assembled and the structure in accordance with the invention properly laminated, it will be found that the provision of the bands or ribbon 18 effectively prevents ingress of moisture and other vapors between the glass sheets, and thus subsequent cracking or degradation of the plastic interlayer disposed therebetween. Further, it should be noted that while the particular unit illustrated and described herein is not electrically conducting, i.e., no electrodes and metal oxide film applied to a surface of one of the sheets, the invention may easily be adapted to such a unit, it only being necessary to sufficiently insulate all the leads from the vapor barrier or bands, if such bands be of a metal composition.

It is to be understood that the form of the invention herewith shown and described is to be taken as a preferred embodiment of the same, and that various changes in the shape, size, dimensions and arrangement of parts may be resorted to without departing from the spirit of the invention.

I claim:

1. In a laminated glass glazing unit comprising at least two sheets of glass and at least one layer of a non-brittle thermoplastic material interposed therebetween and integrally bonded to the sheets, said thermoplastic material being built up around the periphery of such unit to extend outwardly beyond the sheets and form a mounting flange, an annular reinforcing member disposed about the periphery of said unit and projecting inwardly through said thermoplastic material to a point between the glass sheets, a first vapor-impervious band adhered to an edge of the glass sheet forming the inboard panel of the unit and extending through the thermoplastic material into sealed contact with one side of said reinforcing member, and a second vapor-impervious band adhered to an edge of the glass sheet forming the outboard panel of the unit and extending through said thermoplastic material into sealed contact with the other of the sides of the said reinforcing member.

2. In a laminated glass glazing unit comprising at least two sheets of glass and at least one layer of a non-brittle thermoplastic material interposed therebetween and integrally bonded to the sheets, said thermoplastic material being built up around the periphery of such unit to extend outwardly beyond the sheets and form a mounting flange, a flat annular aluminum reinforcing member disposed about the periphery of said unit and projecting inwardly through said thermoplastic material to a point between the glass sheets, a first vapor-impervious flexible aluminum band adhered to and covering the edge of the glass sheet forming the inboard panel of the unit and extending through the thermoplastic material into sealed contact with one side of said reinforcing member, and a second vapor-impervious flexible aluminum band adhered to and covering the edge of the glass sheet forming the outboard panel of the unit and extending through said thermoplastic material to contact with the other of the sides of the reinforcing member.

3. A laminated glass glazing unit in accordance with claim 2, in which said thermoplastic material is composed of a silicone.

4. A laminated glass glazing unit in accordance with claim 3, in which said silicone material interposed between said glass sheets is transparent and said built up portion is pigmented.

5. A laminated glass glazing unit comprising two sheets of glass, one of said sheets having a greater surface area than the other of said sheets and forming the inboard panel of the unit, an interlayer of non-brittle thermoplastic material interposed between the glass sheets and integrally bonded thereto to produce a unitary structure, said thermoplastic material extending outwardly beyond each of said glass sheets and having a thickened portion enclosing the edges of the sheet forming the inboard panel and all but a small portion of the edges of the sheet forming the outboard panel to produce a stepped relation between the thickened portion and the outer major surface of said outboard panel, an annular reinforcing member disposed about the periphery of said unit and projecting inwardly through said thermoplastic thickened portion and said interlayer to a point between the glass sheets, a first vapor-impervious flexible band integrally bonded to and covering the margin or edge of the inboard panel of the unit and extending through the thermoplastic material into sealed contact with the side of said reinforcing member nearest thereto, and a second vapor-impervious flexible band integrally bonded to and covering the margin or edge of the outboard panel of the unit and extending through said thermoplastic material into sealed contact with the other of the sides of said reinforcing member.

6. A laminated glass glazing unit in accordance with claim 5, in which said reinforcing member and said first and second vapor-impervious bands are composed of aluminum.

7. A laminated glass glazing unit in accordance with claim 6, in which said first and second aluminum bands are approximately .05 inch in thickness.

References Cited by the Examiner
UNITED STATES PATENTS

| | | | |
|---|---|---|---|
| 2,576,392 | 1/1951 | Downes | 154—2.74 |
| 3,061,490 | 10/1962 | Ryan | 154—2.74 |
| 3,081,205 | 3/1963 | Shorr | 154—2.74 |

ALEXANDER WYMAN, *Primary Examiner.*

EARL M. BERGERT, *Examiner.*